US008196500B2

(12) United States Patent
Mansfield et al.

(10) Patent No.: US 8,196,500 B2
(45) Date of Patent: Jun. 12, 2012

(54) STITCH FLAP CUTTING BLOCK

(75) Inventors: Ian Charles Mansfield, Northampton (GB); Terence Roy Stone, Northampton (GB)

(73) Assignee: Mansfield Board Machinery Limited, North Hampton (GB)

( * ) Notice: Subject to any disclaimer, the term of this patent is extended or adjusted under 35 U.S.C. 154(b) by 483 days.

(21) Appl. No.: 12/180,102

(22) Filed: Jul. 25, 2008

(65) Prior Publication Data

US 2009/0029837 A1 Jan. 29, 2009

(30) Foreign Application Priority Data

Jul. 28, 2007 (GB) .................................. 0714822.4

(51) Int. Cl.
*B23D 25/12* (2006.01)

(52) U.S. Cl. ......... 83/348; 83/698.41; 493/83; 493/342; 493/365

(58) Field of Classification Search .................... 83/113, 83/115, 117, 118, 347, 348, 500, 542, 582, 83/586, 592, 594, 595, 596, 698.41, 698.42; 493/60, 82, 83, 342, 365–368, 370, 371, 493/373
See application file for complete search history.

(56) References Cited

U.S. PATENT DOCUMENTS 2,801,439 A * 8/1957 Meares ........................... 366/71
2,988,131 A * 6/1961 Frohlich et al. ............ 156/405.1
3,373,643 A * 3/1968 Maximilian .................... 83/620
3,705,526 A * 12/1972 Bishop ....................... 83/698.31
3,771,399 A * 11/1973 Aterianus ....................... 83/348
3,828,637 A * 8/1974 Slack ............................ 83/348
3,926,084 A * 12/1975 Blazer ........................ 83/698.41
4,249,441 A * 2/1981 Sturtz ............................ 83/347
4,370,908 A * 2/1983 DeAlto et al. .................. 83/348
4,725,261 A 2/1988 Millard et al.
4,800,792 A * 1/1989 Bertolotti ..................... 83/356.3
5,224,408 A * 7/1993 Steidinger ....................... 83/674
5,357,836 A * 10/1994 Stromberg et al. ........ 83/698.31
5,775,194 A * 7/1998 Spada ........................ 83/698.31
6,138,543 A * 10/2000 Couturier et al. ............... 83/348
7,080,584 B2 * 7/2006 Boscolo ............................ 83/37
7,631,586 B2 * 12/2009 Agata et al. ..................... 83/332

* cited by examiner

*Primary Examiner* — Edward Landrum

(74) *Attorney, Agent, or Firm* — Heslin Rotheberg Farley & Mesiti P.C.

(57) ABSTRACT

A stitch flap cutting block is mountable to a cutting head of a board blank cutting machine, along with a slotting knife. A sheet of board passed between the cutting head and an anvil head is cut to form a blank for a box or the like. The cutting block comprises a steel body with a cylindrical barrel holding a cylindrical spring block, to which is mounted a blade holder carrying an elongate blade. The blade moves within a transverse slot across the body and is deflectable into the body and may rock about a midpoint of the slot. Impact forces are reduced, cleaner cuts are produced, and re-setting of the blade is required much less often. An alternative stitch flap cutting block is mountable to the cutting head by a separate side arm, facilitating mounting to cutting heads having different diameters.

14 Claims, 4 Drawing Sheets

STITCH FLAP CUTTING BLOCK

CROSS REFERENCE TO RELATED APPLICATIONS

This application claims priority of British application No. 0714822.4 filed on Jul. 28, 2007, the entire disclosure of which is hereby incorporated herein by reference.

BACKGROUND ART

The present invention relates to equipment for cutting cardboard and the like to shape. More particularly but not exclusively, it relates to equipment for automatically cutting out blanks for assembly into packaging boxes and the like, and to a cutting blade mounting for such equipment.

Packaging boxes of card, cardboard, corrugated cardboard, fibreboard or the like (generally referred to hereinafter as "board") are normally produced in two stages. First, a blank is cut out of a sheet of board, in which the requisite panels, flaps and so forth to form the box are clearly defined. In a second operation, the blanks are then creased and folded into the required shape and fastened together to produce a box ready for use. It is critical for rapid and reliable assembly of the boxes that the blanks have been cut precisely. Any inaccuracy or ragged edges may lead to a whole run of blanks being rejected. It is equally important that cuts are made cleanly through the board, and cut out portions of the sheet are fully separated, rather than hanging on by one incompletely cut corner, for example.

A particularly tricky part of a box blank to cut out is the so-called stitch flap. This is the flap by which the side panels of a conventional box are permanently joined together, before the flaps forming the top and bottom are folded into place. The flap may be "stitched" into place (which nowadays usually means using heavy duty staples or the like) or it may be glued. The generic term "stitch flap" is normally employed, whichever fastening method is to be used in practice. An inaccurately cut stitch flap way ruin the conformation of the whole box; there is much less leeway here than there is for the flaps that are to be folded over to make the top or bottom, for example. It has also been found that a stitch flap should not simply be rectangular but should be very slightly tapered, to provide sufficient clearance for the various folds needed to complete the box. This increases the precision required in cutting out the stitch flap. (Note: more details are shown in the Figures and associated description below).

Blanks are cut out using an array of cutting knives or blades mounted to a series of rotatable drums or "heads" spaced along a common axle. A second series of rotatable drums/heads, spaced correspondingly along a second axle parallel to the first, act as anvils. The nip clearance between corresponding heads is sufficient to draw a sheet of board through the gap between them when the heads are counter-rotated about their respective axles. As the board passes between the heads, the cutting blades cut out the various slots and flaps to form the blank. Most of the cuts are made with part-circular slotting knives projecting radially outwardly in the plane of one circular side face of the head, but the blades to cut out the edges of the stitch flap extend substantially perpendicularly thereto. Each of these perpendicular blades is normally mounted to a block which is in turn mounted to an end one of the series of heads/drums; this block is known as a stitch flap cutting block.

Conventionally, these blades have been fixedly mounted to the stitch flap cutting block. However, it has been found that frequent resetting is necessary to produce reliable cuts of the right alignment and depth, and it is extremely inconvenient to have to stop a high-speed line, make it safe and re-set the blade on the stitch flap cutting block. Consequent lost production may be considerable.

It is hence an object of the present invention to provide a stitch flap cutting block that obviates the above disadvantages, but still provides a self-setting effect for its blade, and is compatible with a wider range of board cutting systems.

BRIEF SUMMARY OF INVENTION

According to a first aspect of the present invention, there is provided a cutting block adapted to be mounted to a blank cutting machine as herein defined, comprising support block means mountable to first head means of the cutting machine, compression spring means housed within recess means of the support block means and blade means extending transversely across a face of the mounting block means opposable with second head means of the cutting machine, wherein the blade means is so mounted to the compression spring means as to be resiliently displaceable inwardly of the support block means.

Preferably, the support block means is provided with slot means extending transversely across said face, within which said blade means is constrained to move.

Advantageously, the blade means is so mounted to the compression spring means as to be pivotably displaceable within the slot means.

The recess means preferably comprises an opening so restricted as to retain the compression spring means within the recess means.

Advantageously, said opening intersects with the slot means.

The blade means may be mounted to blade holder means mounted to the compression spring means and extending through said opening.

The recess means may be provided with selectably openable cover means to allow installation and removal of the compression spring means.

In a first embodiment, the compression spring means comprises a body of a material having a non-linear force/deformation response.

The compression spring means may comprise a body of a resilient plastics material.

Said plastics material may comprise a thermoplastics material.

Said plastics material may comprise a polyurethane composition.

Said plastics material may have a Shore "A" hardness of between 70 and 100, optionally a Shore "A" hardness of between 75 and 85.

Said body may be generally cylindrical.

Said body may be provided with a generally axial bore or recess.

The resilience of the compression spring means may then be tailored to a desired value by selection of the material thereof and/or by selection of the relative proportions of the bore or recess to the body as a whole.

In a second embodiment, the support block means comprises blade cassette means provided with recess means housing the compression spring means and at least one exchangeable mounting element adapted to mount the blade cassette means to a preselected head means.

The support block means may comprise at least two said mounting elements.

Advantageously, the or at least one said mounting element is configured substantially to fit the preselected head means.

Preferably, the blade cassette means is detachable from the or each mounting element while the or at least one said mounting element remains attached to the head means.

The compression spring means of the blade cassette means may comprise a compression spring means as described in the first embodiment above.

The head means to which the support block means is mountable preferably comprises substantially cylindrical rotatable drum means.

Preferably, the blade means extends, when mounted, transversely to the direction of rotation of the drum means.

Advantageously, the blade means extends substantially perpendicularly thereto.

An angle between the blade means and a normal to said direction of rotation may be five degrees or less.

Said angle may be two to three degrees.

According to a second aspect of the present invention, there is provided a machine for cutting blanks for boxes and the like, provided with at least one cutting block as described in the first aspect above.

Preferably, the machine comprises two said cutting blocks, so mounted as to cut opposite edges of a stitch flap of a blank.

Advantageously, the blade means of the or each said cutting block is mounted adjacent, optionally immediately adjacent, slotting knife means of the machine.

Fastening means of the or each cutting block means may also fasten said slotting knife means to head means of the machine.

The machine may comprise anvil means, optionally rotatable anvil means, operatively contactable by the or each blade means.

BRIEF DESCRIPTION OF THE DRAWING FIGURES

An embodiment of the present invention will now be more particularly described by way of example and with reference to the accompanying drawings, in which.

DETAILED DESCRIPTION

Figure 1:
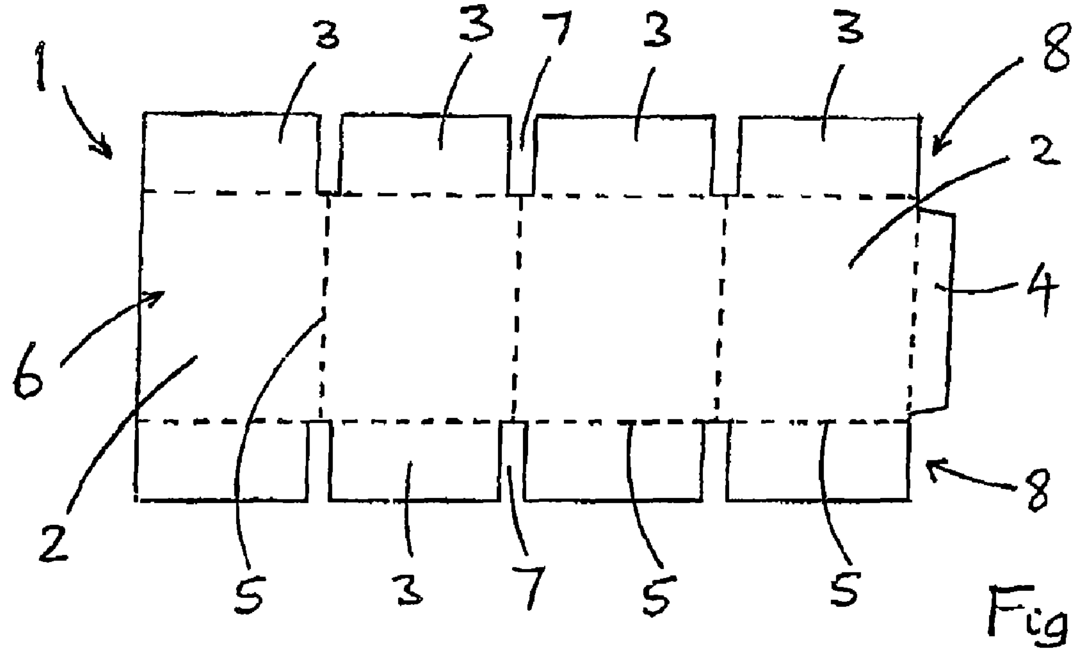
Fig 1 PRIOR ART
FIG. 1 is a schematic plan view of a conventional blank for a packaging box.

Referring now to the Figures, and to FIG. 1 in particular, a typical blank 1 to be assembled into a packaging box comprises four rectangular panels 2 conjoined in series, which will form sidewalls of the box. Flaps 3 extend from each panel 2, and will form a top and bottom of the box. A stitch flap 4 extends from a first end one of the panels 2. To assemble the box, the blank 1 is creased and folded along each of dotted lines 5, and the stitch flap 4 is stitched, stapled or glued to a zone 6 of an end panel 2 remote from the first (the stitch flap 4 is disposed on an inside of the finished box). The flaps 3 are then assembled to make the top and bottom of the box.

The blank 1 is produced from a rectangular sheet of board by cutting out a series of slots 7 to define the flaps 3, and two cut-out portions 8 to define the stitch flap 4. (NB: the slots 7 are shown much wider than would usually be the case, for clarity). To provide clearance to fold down the flaps 3 in the finished box, the stitch flap 4 is not rectangular, but has a slight taper away from the end panel 2. In the past, a five-degree angle to the perpendicular has been used, at both top and bottom edges of the stitch flap 4. However, the more precisely and consistently that the stitch flap 4 can be cut, the smaller this angle can be, and the present invention allows this angle to be reduced to about two and a half degrees.

Figure 2:
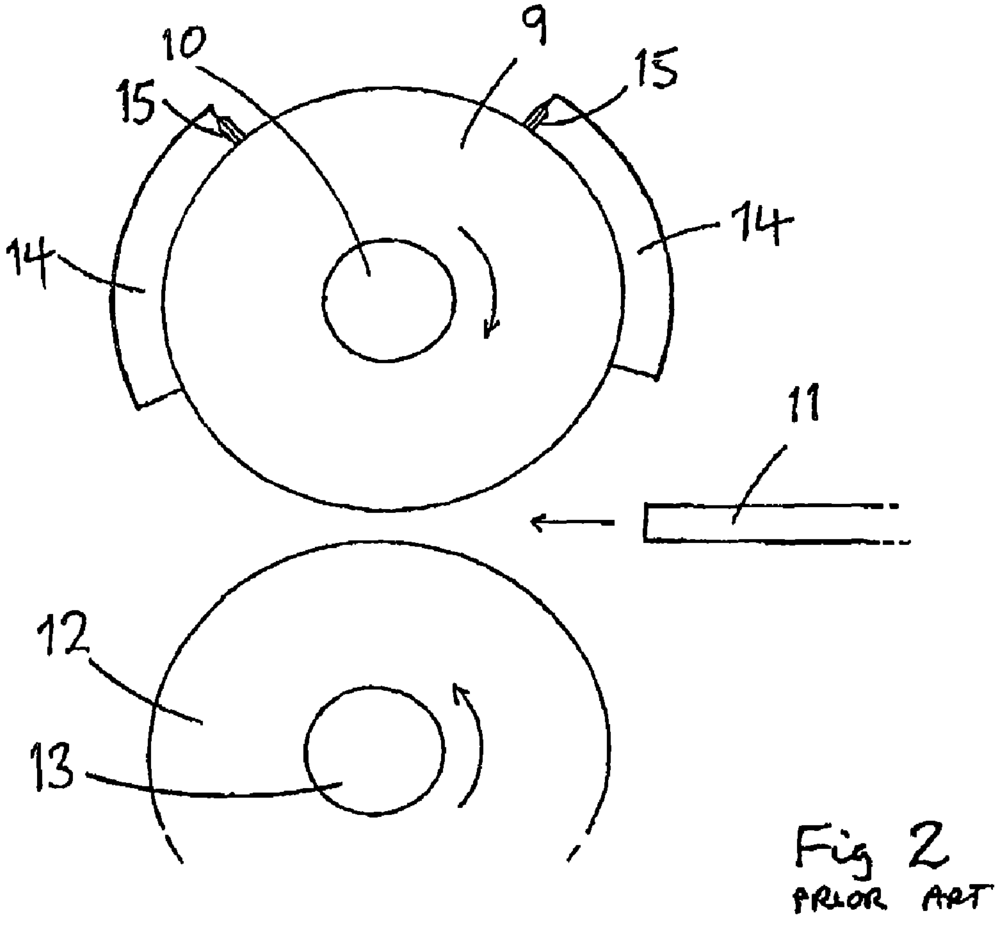
Fig 2 PRIOR ART
FIG. 2 is a schematic side elevation of part of an existing machine for cutting out such blanks, in use.

A conventional arrangement for a printer slotter machine set up for cutting out such blanks is shown schematically in FIG. 2. A cylindrical upper, cutting head 9 is mounted to a first powered axle 10 and a cylindrical lower, anvil head 12 is mounted to a second powered axle 13, extending in parallel to the first axle 10. The upper and lower heads 9, 12 are spaced apart by marginally less than a thickness of a sheet of board 11 to be cut, so that when the heads 9, 12 are rotated in opposite senses, as shown, the sheet 11 will be drawn through between them. The anvil head 12 may be provided with a resilient, tough polyurethane layer on its curved surface, while a remainder of the machinery shown is made of steel.

The upper, cutting head 9 has a pair of arcuate slotting knives 14 mounted thereto (details of mountings are omitted for clarity). The slotting knives 14 each have a part-circular cutting edge. They are so mounted to the upper cutting head 9 that a centre of said circle coincides with the axis of rotation of the head 9, and they extend radially beyond the head 9 sufficiently that the cutting edge may just contact a circular side face of the anvil head 12. Thus, as the heads 9, 12 rotate, each of the knives 14 in turn will cut through a sheet 11 offered up between them, in the direction of motion of the sheet 11. (NB: the cutting head 9 and anvil head 12 are also known simply as the upper and lower head, respectively, from their normal positions in the machine).

The upper, cutting head 9 also has two blades 15 mounted transversely thereto. Each blade 15 is mounted adjacent an end of a respective slotting knife 14 and extends a slightly smaller distance from the surface of the head 9, so that it may contact the curved surface of the anvil head 12. Thus, as the sheet 11 passes between the heads 9, 12, the blades 15 produce transverse cuts therein, which link up with the cuts produced by the slotting knives 14 to separate the cut-out portions 8 from the sheet 11, forming the stitch flap 4 in the resulting blank 1. The blades 15 are each set at a slight angle to a normal to the slotting knives 14, so as to produce the required tapered edges on the stitch flap 4.

Similar pairs of cylindrical cutting and anvil heads are provided further along the axles 10, 13, arranged to cut out the slots 7 between the flaps 3 of the blank 1. The cutting head of each pair is provided with a pair of slotting knives 14, spaced a small distance apart so as to cut each edge of a respective slot 7 simultaneously. Further (known) arrangements (not shown) are provided to remove the strips of sheet 11 produced by these cuts. A blank 1 can thus be cut out of a sheet 11 of board, passed broadside between the pairs of heads, in a single operation.

The stitch flap 4 is probably the most critical element of the blank 1, to ensure that the box can be assembled rapidly and in the correct shape, and so accurate positioning of the stitch flap 4 and cutting of its edges is very important.

Cutting the slots 7 is generally found to be relatively trouble free. However, accurate and repeatable cutting of the stitch flap 4 may be more difficult. The transverse blades 15 are normally clamped to heavy steel blocks, which are mounted in turn to the upper head 9. The blades 15 are very carefully set up so that their cutting edges will precisely cut through the sheet 11 across their entire width, without excess pressure on the anvil head 12. If a blade 15 is set too high, its cutting edge will be hammered into the opposing surface of the anvil head 12, potentially damaging the blade 15, the blade's mounting, the block and/or the anvil head 12. This may well also loosen the clamps holding the blade 15 in place, allowing the blade 15 to drift out of alignment. If the blade 15 is set too low (or becomes too low) a complete, clean cut through the sheet 11 will not occur. Similarly, if the respective blade 15 and slotting knife 14 become misaligned, their cuts may not meet, leaving the cut-outs 8 still linked to the blank 1 at one corner. Failed cut-off waste will cause problems further down the production line that are costly to resolve.

Setting exactly the right blade height, and ensuring that its cutting edge is level, is a tedious and time-consuming job for a process operator. This may result in the job being skimped. Even if it is done properly, it will inevitably involve substantial down-time. The machinery for cutting out the blanks 1 is usually run at high speed, with a high throughput of sheets 11, for as long a run as possible. The time required to stop a machine, make it safe, re-set a blade and set the machine going again would correspond to a significant loss of production.

The same problems are experienced between runs, when the blade height must usually be re-set for a different thickness of board.

Figure 3:
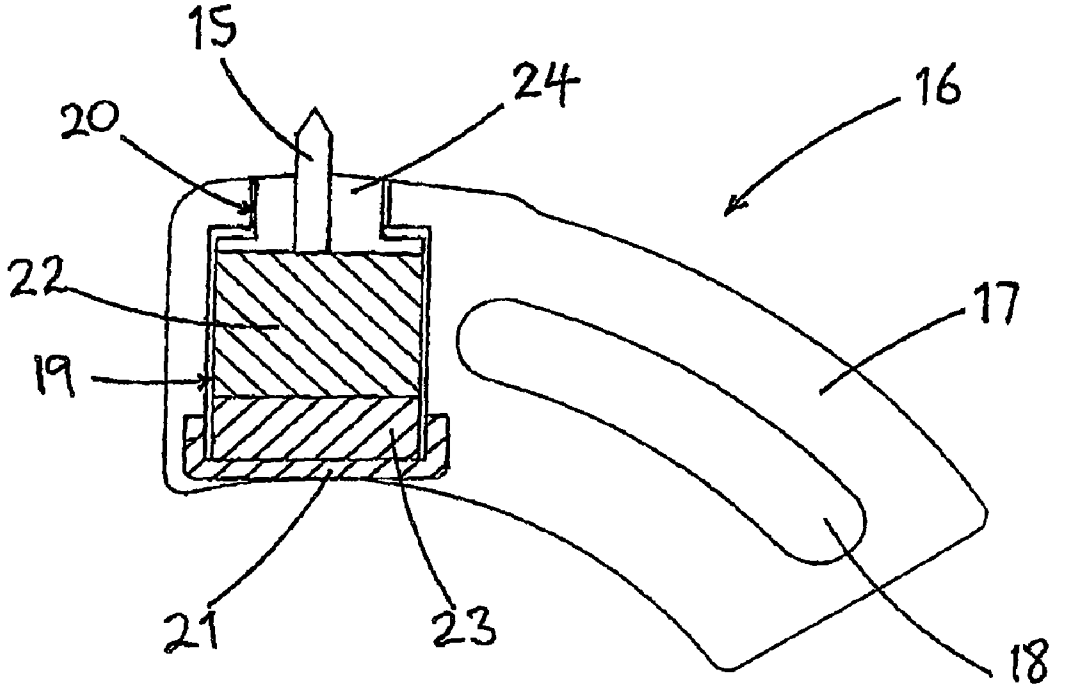
FIG. 3 is a cross-sectional side elevation of a first cutting block embodying the present invention.
Figure 4:
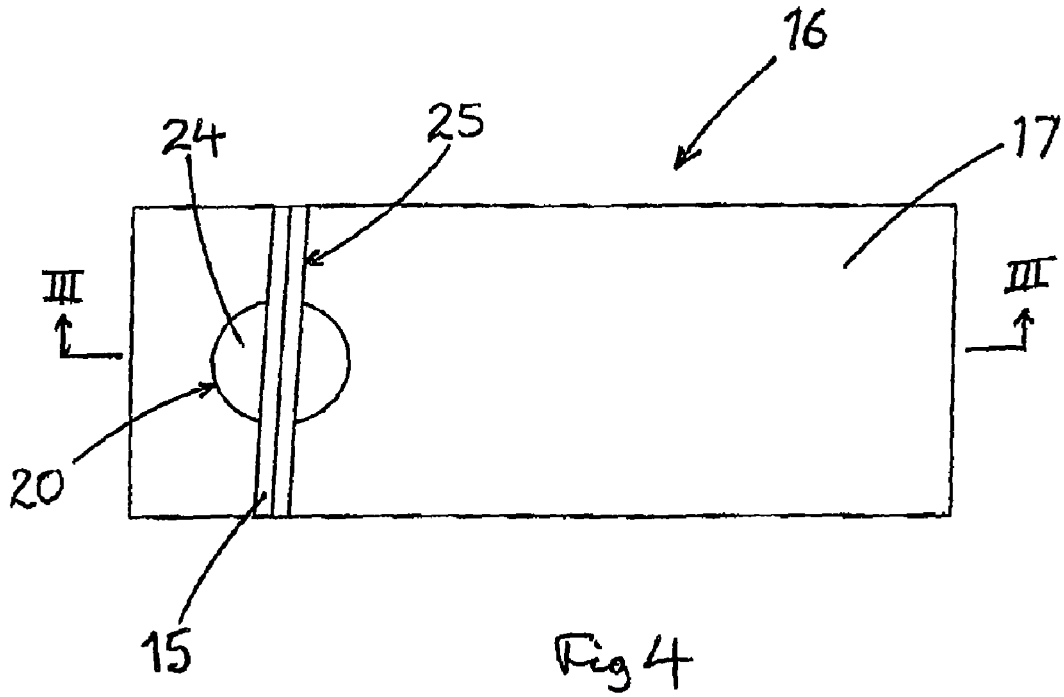
FIG. 4 is a plan view from above of the first cutting block shown in FIG. 3.

A first cutting block 16 that obviates these problems is shown in FIGS. 3 and 4. The first cutting block 16 comprises a monolithic steel body 17, provided with at least one socket 18 extending therethrough by which it may be bolted to a circular side face of a cutting head 9, adjacent its circumference. The same bolts may be used to mount a neighbouring slotting knife 14 to the head. The body 17 is preferably curved, as shown, to conform substantially to a circular rim of the cutting head 9.

Adjacent an end of the body 17, there is provided a substantially cylindrical barrel 19 extending substantially radially through the curved body 17 between its concave and convex faces. The barrel 19 has a mouth portion 20 adjacent the convex face of the body 17 which is of smaller diameter than a remainder of the barrel 19. A removable screw cap 21 closes the barrel 19 adjacent the concave face of the body 17.

The barrel 19 holds a cylindrical spring block 22 comprising a resilient plastics material, such as polyurethane. A polyurethane composition having a Shore "A" hardness of approximately 80 has been found to be particularly suitable. In this particular example, a rigid spacer 23 is located between the cap 21 and the spring block 22, so that the spring block 22 fits the dimensions of the barrel 19.

A metal blade holder 24 is mounted to an end of the spring block 22 remote from the cap 21, and extends into the mouth portion 20 of the barrel 19. A blade 15 is fastened to the blade holder 24.

As best shown in FIG. 4, the blade 15 extends transversely across the convex face of the body 17. The blade 15 is disposed within an elongate slot 25 extending from side to side of the body 17 and intersecting with the mouth portion 20 of the barrel 19. The slot 25 is aligned at two to three degrees away from a normal to a side of the body 17 (and thus at two to Free degrees to a normal to the side of the cutting head 9 and the neighbouring slotting knife 14).

In use, the blade 15 will slice through a sheet 11 of board passed between the cutting block 16 and a respective anvil head 12, and then come into contact an opposed face of the anvil head 12. This will cause the spring block 22 to compress slightly, allowing the blade bolder 24 to retract into the barrel 19 and the blade 15 to retract further into the slot 25. Once the cutting block 16 has rotated away from the anvil head 12, the spring block 22 returns the blade 15 to its original disposition.

This deflection of the blade 15, substantially radially of the cutting head 9, significantly reduces impact forces between the blade 15 and the anvil head 12, obviating damage to the anvil head 12, the blade 15 and its mountings. The cutting block 16 is also close to self-adjusting. It will cut through any thickness of board presented to it, then retract just as far as necessary once it contacts the anvil head 12. There is thus no need to readjust the blade height between runs on different grades or thicknesses of board. Unlike in the case of a rigid blade mounting, the blade height is unlikely to drift significantly in use. Even if it does, or if the separation between the cutting head 9 and the anvil head 12 drifts, re-adjustment should only prove necessary should the blade 15 no longer be able to roach the anvil head 12 (which is highly unlikely). There is hence far less need to stop a production line and re-adjust the blade 15 in position, or to replace a damaged blade 15, than is the case for conventional mountings.

A further benefit of the first cutting block 16 is that the blade 15 can rock slightly within the slot 25, pivoting About its midpoint, while the spring block 22 biases it back to a level disposition. This appears to improve the quality of the cut produced by the blade 15. Because the blade 15 is mounted at a slight angle across the cutting block 16, as the heads 9, 12 rotate one end of the blade 15 will contact the sheet 11 to be cut (and the anvil head 12) first. As the cutting head 9 rotates further, the point of contact then travels along the blade 15 to its far end. Thus, the blade 15 slices through the sheet 11 rather than chopping or stamping through it in a single action. Allowing the blade 15 to rock slightly, depending on which part of it is instantaneously in contact with the sheet 11 and anvil head 12, improves the efficiency and cleanness of the cut even further.

It is possible to employ a helical metal spring of conventional form in place of the resilient polyurethane spring block 22 shown. However, the resilient spring block 22 provides several further advantages. It is lighter in weight, and much less liable to failure, for example as a result of fatigue after prolonged use. If a metal spring were to fail, the resulting debris could be dangerous, since the heads 9, 12 are rotating at very high speeds. The most likely eventual failure mode of a resilient plastics block 22, on the other hand, would be to deform and not fully resume its original form, rather than to break up. Even if it did break up, the debris would be less dangerous than metal spring fragments.

A further unanticipated advantage of the resilient plastics spring block 22, over a helical metal spring in the same first cutting block 16, is that it produces an even better cut. It is believed that the imposed force/deflection response of the helical metal spring is substantially linear, over the force and deflection ranges experienced in practice (a value of 4 kgf per millimetre is believed to be typical). However, it appears that the imposed force/deflection response for polyurethane (and many other resilient plastics materials suitable for the spring block 22) is non-linear, possibly even exponential. The spring block 22 is thus relatively "soft" on initial contact, but firms up as the blade 15 deflection increases. Although the exact mechanism is not yet clear, this behaviour improves the performance of the first cutting block 16 even beyond its capabilities with a metal sprig in the barrel 19.

Instead of a solid cylindrical spring block 22, as shown, it is also possible to use a block with an axial bore (e.g. forming a thick-walled hollow cylinder). This still fits the barrel 19, but has a lesser cross-sectional area, and so has a lesser resistance to deflection. (One may also then provide studs on respective surfaces of the blade holder 24, spacer 23 or cap 21, which fit within said axial bore to help to locate the spring block accurately). One may thus vary the Shore hardness of the material of the spring block 22, vary its height with use of corresponding spacers 23, and vary its cross-section, all of which would subtly change its force/deflection response. (However, the versatility of the arrangement shown is such that once a particular spring block 22 has been selected, the cutting block 16 will outperform a conventional blade mounting in practically any situation, without the need to exchange spring blocks 22).

Figure 5:
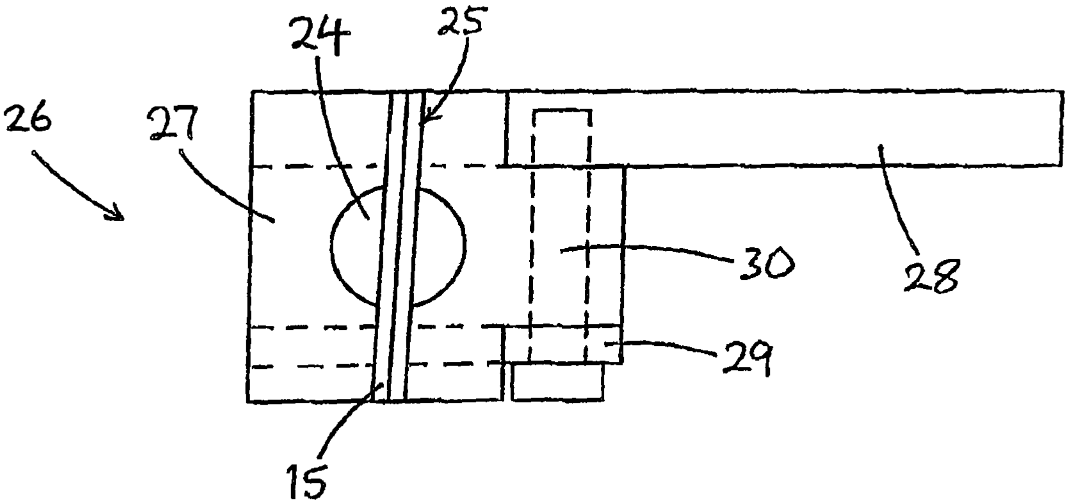
FIG. 5 is a plan view from above of a second cutting block embodying the present invention.
Figure 6:
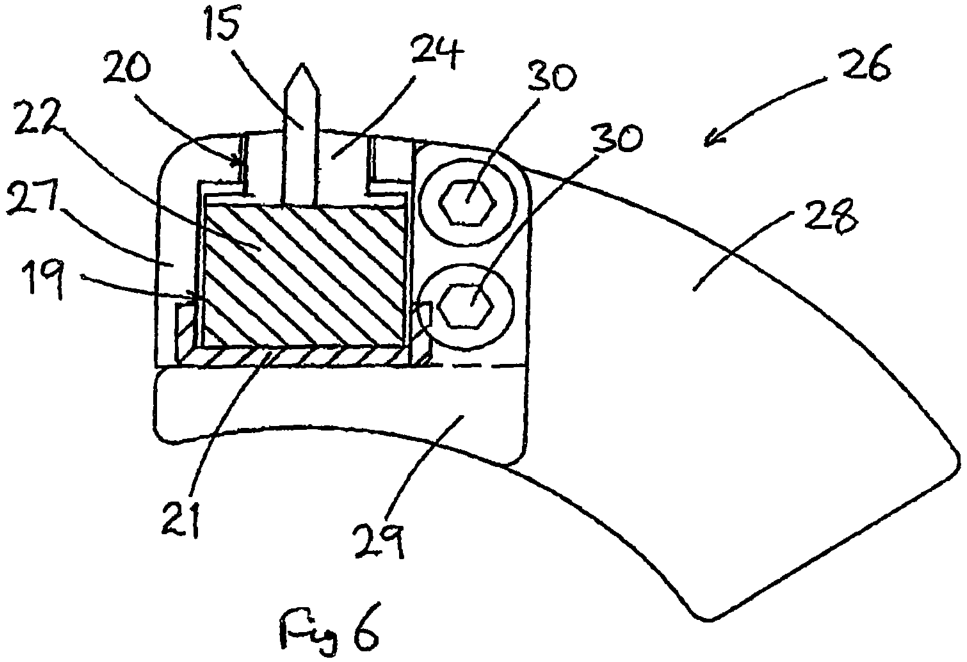
FIG. 6 is a cross-sectional side elevation of the second cutting block shown in FIG. 5.
Figure 7:
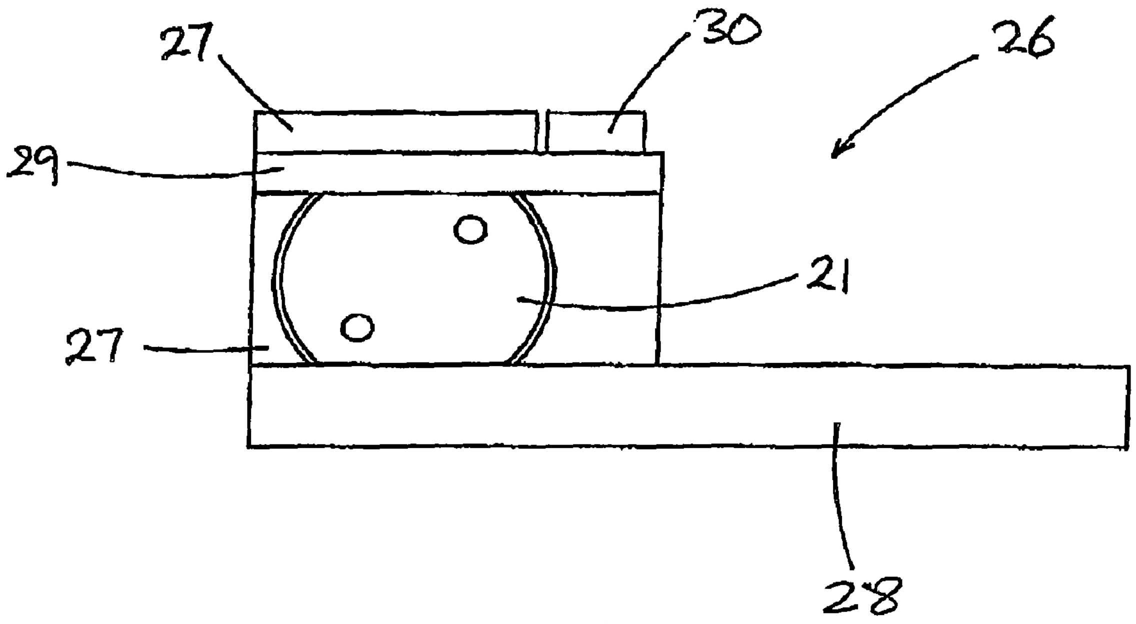
FIG. 7 is a plan view from below of the second cutting block shown in FIG. 5.

A second cutting block 26 embodying the present invention is shown in FIGS. 5 to 7. The second cutting block 26 comprises a steel cassette body 27, provided with a cylindrical barrel 19 of substantially the same form as that of the first cutting block 16. This, too, has a narrow mouth portion 20 at a first end and a screw cap 21 closure at a second end remote from the first. A cylindrical polyurethane spring block 22 is retained within the barrel 19, a blade holder 24 is mounted to the spring block 22 and extends into the mouth portion 20, and a blade 15 is mounted to the blade holder 24. The blade 15 is retained within a transverse slot 25 intersecting with the mouth portion 20 of the barrel 19.

However, in this cutting block 26, the cassette body 27 is just large enough to enclose the barrel 19. An elongate curved side arm 28 is detachably mounted adjacent one end to a first side face of the cassette body 27, and a generally L-shaped outrigger 29 is detachably mounted to a second side of the cassette body 27, opposite the first. Two bolts 30 extend through corresponding apertures in the outrigger 29, cassette body 27 and side arm 28, clamping the cassette body 27 securely between the outrigger 29 and side arm 28 to form a rigid unit. The side arm 28 is mountable to a side face of the cutting head 9 (e.g. by means of one or more sockets, as shown for the first cutting block 16 but omitted here for clarity).

The second cutting block 26 performs, in use, identically to the first cutting block 16; a helical metal spring may be used in place of the resilient polyurethane spring block 22, for example. However, it also provides further benefits.

The side arm 28 should be curved to correspond substantially to the curvature of the cutting head 9. However, the cassette body 27 is an universal component, which can be used, in combination with side arms 28 of appropriate curvatures, on cutting heads 9 of different diameters. This avoids the need to keep separate stocks of first cutting heads 16 having all possible curvatures. Instead, a smaller stock of relatively expensive and complex cassette bodies 27 can be fitted with whichever (cheaper and simpler) side arm 28 and outrigger 29 is appropriate to the desired cutting head 9.

A further benefit is that the mass of the assembled second cutting head 26 is significantly less than that of the first cutting head 16, and so its angular momentum when in use will be lower. This reduces the power needed to drive a cutting head 9 bearing one or more second cutting heads 26, and permits the cutting head 9 to be accelerated up to speed and braked after use more rapidly.

It is also possible to mount the complete second cutting block 26 to a cutting head 9, then if it becomes necessary to adjust the blade 15 and its mounting arrangement, the bolts 30 may be withdrawn, separating the cassette body 27 from the side arm 28, which remains attached to the cutting head 9. The cassette body 27 may then be replaced on the side arm 28 after adjustment. The positive location of the cassette body 27 on the side arm 28 means that realignment of the blade 15 position is unlikely to be necessary. Since the side arm 28 stays in place on the cutting head 9, and the slotting knife 14 is held between the side arm 28 and the cutting head 9, the slotting knife 14 will also not require realignment.

The invention claimed is:

1. A cutting block adapted to be mounted to a blank cutting machine having two opposed heads, comprising a body having a first side adapted to be mounted to a lateral side face of a first rotatable cutting head of the blank cutting machine, a compression spring housed within a recess in the body and a blade extending transversely across a top face of the body opposable with a second head of the blank cutting machine, the blade being so mounted to the compression spring as to be resiliently retractable into the body; wherein the body is provided with a slot, within which the blade is constrained to move, the slot being oriented at an angle greater than zero degrees from a normal to said first side of the body;

the blade is so mounted to the compression spring as to be freely pivotably displaceable within the slot;

whereby, when the body is mounted to the lateral side face of the first rotatable cutting head of the blank cutting machine, the blade extends transversely to the direction of rotation of the first rotatable cutting head and an angle between the blade and a normal to said direction of rotation is greater than zero degrees; and wherein the recess extends from the top face of the body into the body, and said body further comprises a removable cap closing an end of said recess.

2. A cutting block as claimed in claim 1, wherein the slot is oriented at an angle of two to three degrees from the normal to the first side of the body, and at an angle of two to three degrees with respect to the normal to said direction of rotation.

3. A cutting block as claimed in claim 1, wherein the compression spring comprises a body of a material having a non-linear force/deformation response.

4. A cutting block as claimed in claim 1, wherein the compression spring comprises a body of resilient plastics material.

5. A cutting block as claimed in claim 4, wherein said plastics material comprises a polyurethane composition having a shore "A" hardness of approximately 80.

6. A cutting block as claimed in claim 1, wherein the body comprises a blade cassette element provided with said recess housing the compression spring and an exchangeable mounting element adapted to mount the blade cassette element to said first rotatable cutting head.

7. A cutting block as claimed in claim 6, wherein the blade cassette element is detachable from the mounting element while the mounting element remains attached to the first rotatable cutting head.

8. A cutting block as claimed in claim 1, wherein an angle between the blade and said normal to said direction of rotation is no more than five degrees.

9. A cutting block as claimed in claim 1, wherein the blade is mounted to the compression spring so as to be freely pivotally displaceable about a midpoint of the blade along the slot, and the blade slices first at an end of the blade near the first side and then along the blade to a far end of the blade.

10. A cutting machine for cutting blanks for boxes and the like, provided with a cutting block comprising a body having a first side mountable to a lateral side face of a first rotatable cutting head of the cutting machine, a compression spring housed within a recess in the body, the recess extending from a mouth portion on a top face of the body into the body, a removable cap closing an end of said recess, and a blade extending transversely across the top face of the body opposable with a second head of the blank cutting machine, wherein:

the body is provided with a slot that intersects with the mouth portion of the recess, within which the blade is constrained to move, the slot being oriented at an angle greater than zero degrees from a normal to said first side of the body;

the blade is mounted, within the recess, to the compression spring housed within the recess, the blade is so mounted to the compression spring as to be resiliently retractable into the body, and the blade is so mounted to the compression spring as to be freely pivotally displaceable within the slot;

whereby when the body is mounted to the lateral side face of the first rotatable cutting head of the blank cutting machine, the blade extends transversely to the direction of rotation of the first rotatable cutting head and an angle between the blade and a normal to said direction of rotation is greater than zero degrees, and the blade is adapted to produce a slicing action when cutting a tapered edge in a board being cut.

11. A cutting block as claimed in claim 10, wherein the mouth portion of the recess is so restricted as to retain the compression spring within the recess.

12. A cutting block as claimed in claim 11, wherein the blade is mounted to a blade holder mounted to the compression spring and extending through said slot.

13. A cutting machine as claimed in claim 10, wherein said first rotatable cutting head comprises a substantially cylindrical rotatable drum.

14. A cutting machine as claimed in claim 10, wherein the angle between the blade and the normal to said direction of rotation is two to three degrees.

* * * * *